(12) United States Patent
Zeng et al.

(10) Patent No.: US 10,181,216 B2
(45) Date of Patent: Jan. 15, 2019

(54) GENERATING SLICE DATA FROM A VOXEL REPRESENTATION

(71) Applicant: Hewlett-Packard Development Company, L.P., Houston, TX (US)

(72) Inventors: Jun Zeng, Palo Alto, CA (US); Pu Huang, Los Angeles, CA (US); Sebastia Cortes, Barcelona (ES); Scott A. White, Barcelona (ES); Gary J. Dispoto, Mountain View, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/542,901

(22) PCT Filed: Jan. 30, 2015

(86) PCT No.: PCT/US2015/013891
§ 371 (c)(1),
(2) Date: Jul. 11, 2017

(87) PCT Pub. No.: WO2016/122634
PCT Pub. Date: Aug. 4, 2016

(65) Prior Publication Data
US 2017/0372513 A1 Dec. 28, 2017

(51) Int. Cl.
*G06T 17/00* (2006.01)
(52) U.S. Cl.
CPC .................... *G06T 17/00* (2013.01)
(58) Field of Classification Search
CPC ..... B33Y 50/00; G06F 17/5018; G06F 17/50; G06F 17/5086; B29C 64/386;
(Continued)

(56) References Cited

U.S. PATENT DOCUMENTS 7,167,816 B1 * 1/2007 Olovsson ............ G06F 17/5018
700/98
8,175,734 B2 5/2012 Fogel et al.
(Continued)

FOREIGN PATENT DOCUMENTS

WO WO-2010011911 1/2010

OTHER PUBLICATIONS

International Search Report and Written Opinion dated Oct. 29, 2015, PCT Patent Application No. PCT/US2015/013891, filed Oct. 29, 2015, European Patent Office.
(Continued)

*Primary Examiner* — Haixia Du
(74) *Attorney, Agent, or Firm* — HP Inc. Patent Department

(57) ABSTRACT

An example technique for generating slice data from a voxel representation can include obtaining a shape specification of the 3-D object. The example technique for generating slice data from a voxel representation can also include obtaining a material specification of the 3-D object. The example technique for generating slice data from a voxel representation can also include merging the shape specification and the material specification to create a voxel representation of the 3-D object, wherein each voxel in the voxel representation includes a plurality of data types. The example technique for generating slice data from a voxel representation can also include generating slice data from the voxel representation, wherein the slice data provides a higher resolution than that provided by the voxel representation using the plurality of data types.

17 Claims, 7 Drawing Sheets

(58) Field of Classification Search
CPC ...... G05B 19/4099; G05B 2219/35217; G06T 17/00; G06T 2219/008; G06T 17/20; G06T 17/10; A61C 13/0004; A61C 13/0019
See application file for complete search history.

(56) References Cited

U.S. PATENT DOCUMENTS

| | | | |
|---|---|---|---|
| 8,801,418 B2 | 8/2014 | El et al. | |
| 2003/0012419 A1* | 1/2003 | Accomazzi | G06T 15/08 382/131 |
| 2011/0087350 A1 | 4/2011 | Fogel et al. | |
| 2012/0001909 A1* | 1/2012 | Garg | G06T 17/20 345/423 |
| 2012/0065755 A1 | 3/2012 | Steingart et al. | |
| 2013/0095302 A1 | 4/2013 | Pettis et al. | |
| 2013/0262028 A1 | 10/2013 | De Prisco et al. | |
| 2014/0031967 A1 | 1/2014 | Unger | |
| 2014/0085305 A1 | 3/2014 | Engel | |
| 2014/0146047 A1* | 5/2014 | Wu | G06T 17/00 345/424 |
| 2014/0277664 A1 | 9/2014 | Stump | |
| 2014/0324204 A1* | 10/2014 | Vidimce | B29C 67/0088 700/98 |
| 2017/0102679 A1 | 4/2017 | Greene et al. | |

OTHER PUBLICATIONS

Vidimce, et al., "OpenFab: A Programmable Pipeline for Multi-Material Fabrication", Jul. 2013 http://dl.acm.org/citation.cfm?id=2461993.

Doubrovski E L et al: "Voxel-based fabrication through material property mapping: A design method for bitmap printing", Computer Aided Design, Elsevier Publishers BV., Barking, GB, vol. 60, Jun. 5, 2014 (Jun. 5, 2014), pp. 3-13.

Jones M W et al: "Shape representation using space filled sub-voxel distance fields", Shape Modeling and Applications, SMI 2801 International Conference on. May 7-11, 2001, Piscataway, NJ, USA,IEEE, May 7, 2081 (May 7, 2001), pp. 316-325.

Bernd Bickel, et al., "Design and fabrication of materials with desired deformation behavior", ACM Transactions on Graphics (TOG), ACM, US, vol. 29, No. 4, Jul. 26, 2010 , 10 pages.

Kiril Vidimče, et al., "OpenFab: A Programmable Pipeline for Multi-Material Fabrication", ACM Transactions on Graphics (TOG), vol. 32, No. 4, Jul. 1, 2013, 12 pages.

* cited by examiner

GENERATING SLICE DATA FROM A VOXEL REPRESENTATION

CLAIM FOR PRIORITY

The present application is a national stage filing under 35 U.S.C. § 371 of PCT application number PCT/US2015/013891, having an international filing date of Jan. 30, 2015, the disclosure of which is hereby incorporated by reference in its entirety.

BACKGROUND

Three dimensional (3-D) printing is a term commonly used to describe processes used to make 3-D objects. In 3-D printing, an additive process may be used to successively layer material to create a 3-D object. The 3-D objects can be virtually any shape but are generally limited to a single material. The resolution of a printed 3-D object is limited by the resolution of a 3-D printer used to print the 3-D object.

DETAILED DESCRIPTION

Generating slice data from a voxel representation of a three dimensional (3-D) object can include obtaining a shape specification of the 3-D object and a material specification of the 3-D object. As used herein, a 3-D object is an object that can be represented along an x-axis, a y-axis, and a z-axis. A shape specification defines a shape (e.g., geometry) of a 3-D object. A material specification defines a material(s) and/or material property (e.g., elasticity, strength, and/or color, among other material properties) that form the 3-D object. Generating slice data from a voxel representation of a 3-D object can also include merging the shape specification and the material specification to create a voxel representation of the 3-D object, wherein each voxel in the voxel representation includes a plurality of data types. The slice data provides a higher resolution than that provided by the voxel representation using the plurality of data types.

In a number of other approaches, a voxel is a volumetric entity on a 3-D grid that is the most-basic building block for a 3-D object. Therefore, the resolution of any shape and/or material change can reach at most voxel level without dividing the voxels which results in additional demands for computing resources (e.g., processing resource and/or memory resource) as compared to not dividing the voxels. Details smaller than a voxel may be discarded. This is a shortcoming compared to representing a 3-D object using a boundary mesh where the sharp features (e.g., corners) are preserved.

In contrast, a number of examples of the present disclosure provide that each voxel is associated with a plurality of data types to encode features of the 3-D object. The data types in association with the voxel can be used to decode features of the 3-D object that have a higher resolution than a given voxel.

Figure 1:
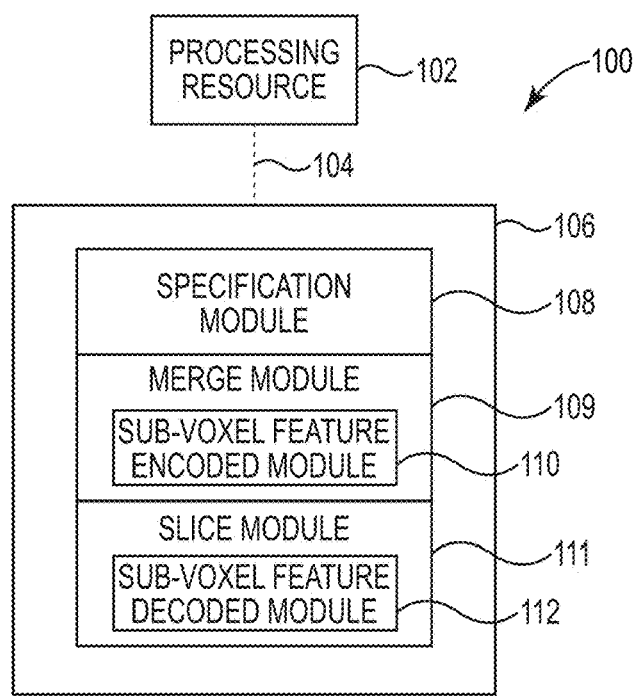
FIG. 1 illustrates a block diagram of an example of a computing device according to the present disclosure.

FIG. 1 illustrates a block diagram of an example of a computing device according to the present disclosure. The computing device 100 can include a processing resource 102 connected 104 to a memory resource 106, (e.g., a computer-readable medium (CRM), machine readable medium (MRM), database, etc.). The memory resource 106 can include a number of computing modules. The example of FIG. 1 shows a specification module 108, a merge module 109, a sub-voxel feature encoded module 110, a slice module 111, and a sub-voxel feature decoder module 112. As used herein, a computing module can include program code (e.g., computer executable instructions, hardware, firmware, and/or logic) but includes at least instructions executable by the processing resource 102 (e.g., in the form of modules, to perform particular actions, tasks, and functions described in more detail herein in reference to FIGS. 3-8).

The specification module 108, as used herein and as will be explained in more detail in connection with FIG. 3, can include instructions that are executed by the processing resource 102 to create and/or receive a number of shape specifications and/or a number of material specifications. The shape specifications can describe the shape (e.g., geometry) of the 3-D object. For example, a single shape specification can describe the 3-D object or each of a plurality of shape specifications can describe a plurality of portions of the 3-D object. The material specifications can describe the materials and/or a number of properties associated with the material(s) that form the 3-D object. The material specification can be defined by a plurality of material property values.

A merge module 109 can include instructions that are executed by the processing resource 102 to merge the number of shape specifications with the number of material specifications. The shape specifications and the material specifications can be merged to create a single model of the 3-D object. The single model of the 3-D object can be defined by a grid (e.g., a 3-D grid) of voxels. A voxel can be a volume associated with the 3-D space. The voxel can be associated with a number of data types that can define features of the 3-D object at a higher resolution that that provided by the grid of voxels. The position of a voxel can be inferred based upon its position relative to other voxels. The grid of voxels that is created from the merging of the shape specification 330 and the material specification 332 is an example of a model of the 3-D object. FIG. 3 further describes the result of merging the shape specification with the material specification.

A sub-voxel feature encoded module 110 includes instructions that are executed by the processing resource 102 to encode a number of features associated with the 3-D object within each of the grid of voxels. The sub-voxels features are encoded by storing data (e.g., data types) within a voxel. In a number of examples, the sub-voxel feature encoded module 110 can be a sub-module to merge module 109. The sub-voxel feature encoded module 110 can also be a module independent of merge module 109.

A slice module 111 includes instructions that are executed by the processing resource 102 to provide slice data. Slice data is data derived from the model of the 3-D object that can be provided to and used by the 3-D printer to print the 3-D object. The slice data is further described in FIG. 3.

A sub-voxel feature decoded module 112 includes instructions that are executed by the processing resource 102 to decode features of the 3-D object that have a higher resolution than the resolution provided by the grid of voxels from a given voxel. The sub-voxel feature decoded module 112 can decode features with a higher resolution than the resolution provided by any voxel from the grid of voxels to print a 3-D object with a higher resolution than the resolution provided by the grid of voxels. FIG. 1 shown sub-voxel feature decoded module 112 as a sub-module of slice module 111. Sub-voxel feature decoded module 112 can also be an independent module and does not have to be a sub-module to slice module 111.

The number of modules shown in FIG. 1 (e.g., specification module 108, merge module 109, sub-voxel feature encoded module 110, slice module 111, and sub-voxel feature decoded module 112) can be combined with other modules or be sub-modules of other modules. The modules can be stored in a memory resource 106 as shown in FIG. 1 and/or be contained within the same computing device. In another example, the number of modules (e.g., specification module 108, merge module 109, sub-voxel feature encoded module 110, slice module 111, and sub-voxel feature decoded module 112) can comprise individual modules at separate and distinct locations on different memory resources (e.g., CRM, etc.) such as in a distributed computing environment (e.g., cloud computing environment). Further, the processing resource 102 executing instructions associated with a particular module (e.g., specification module 108, merge module 109, sub-voxel feature encoded module 110, slice module 111, and sub-voxel feature decoded module 112) can function as an engine, such as the example engines shown in FIG. 2. As used herein, the number of modules and/or the number of engines can include more or less engines/modules than those shown.

Figure 2:
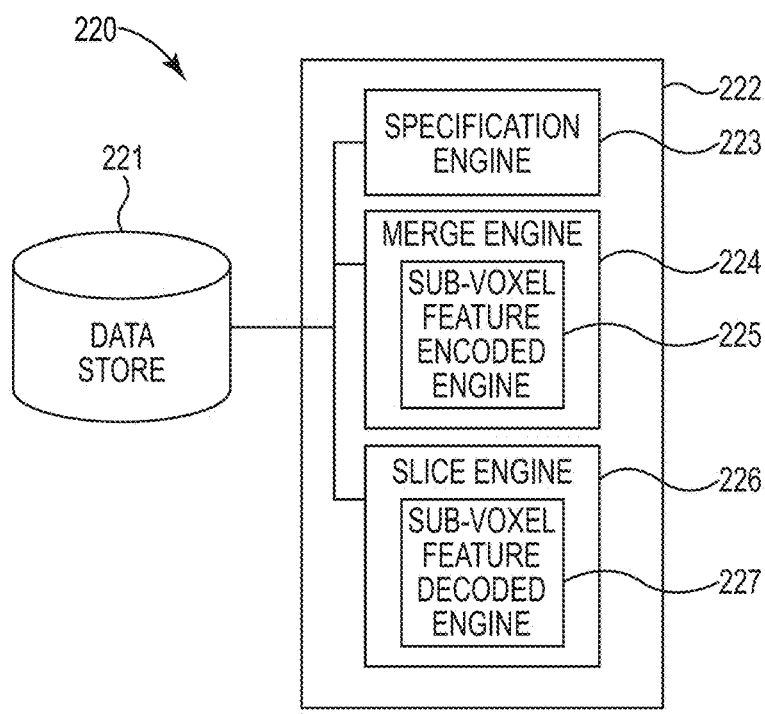
FIG. 2 illustrates a block diagram of an example of a system to generate slice data from a voxel representation according to the present disclosure.

FIG. 2 illustrates a block diagram of an example of a system to generate slice data from a voxel representation according to the present disclosure. The system 220 can perform a number of functions and operations as described in FIG. 3 (e.g., generating data to drive a 3-D printer). The system 220 can include a data store 221 connected to a user defined function system 222. In this example, the user defined function system 222 can include a number of computing engines. The example of FIG. 2 shows a specification engine 223, a merge engine 224, a sub-voxel feature encoded engine 225, a slice engine 226, and a sub-voxel feature decode engine 227. As used herein, a computing engine can include hardware firmware, logic, and/or executable instructions, but includes at least hardware (e.g., a processor, transistor logic, application specific integrated circuit (ASIC), etc.) executing instructions to perform particular actions, tasks and functions described in more detail herein in reference to FIG. 3.

In the example of FIG. 2, the specification engine 223 can include hardware and/or a combination of hardware and programming (e.g., executable instructions), but at least hardware, to create, receive, and/or define a number of specifications of a 3-D object. A merge engine 224 can include hardware and/or a combination of hardware and programming, but at least hardware, to merge the specifications of the 3-D object to create a model of the 3-D object. A sub-voxel feature encoded engine 225 can include hardware and/or a combination of hardware and programming, but at least hardware, to encode features of the 3-D object into a voxel. The sub-voxel feature encoded engine 225 can be a sub-engine of merge engine 224 and/or an engine independent of merge engine 224

A slice engine 226 can include hardware and/or a combination of hardware and programming, but at least hardware, to slice the model of the 3-D object and provide the slice data to a 3-D printer. A sub-voxel feature decode engine 227 can include hardware and/or a combination of hardware and programming, but at least hardware, to decode features of the 3-D object from a voxel. The sub-voxel feature decode engine 227 can be a sub-engine of slice engine 226 and/or an engine independent of slice engine 226.

The specification engine 223, the merge engine 224, the sub-voxel feature encode engine 225, the slice engine 226, and the sub-voxel feature decode engine 227 shown in FIG. 2 and/or the specification module 108, the merge module 109, the sub-voxel feature encoded module 110, the slice module 111, and the sub-voxel feature decoded module 112 in FIG. 1 can be sub-engines/modules of other engines/modules and/or combined to perform particular actions, tasks, and functions within a particular system and/or computing device. Further, the engines and/or modules described in connection with FIGS. 1 and 2 can be located in a single system and/or computing device or reside in separate distinct locations in a distributed computing environment, (e.g., cloud computing environment). Examples are not limited to these examples.

Figure 3:
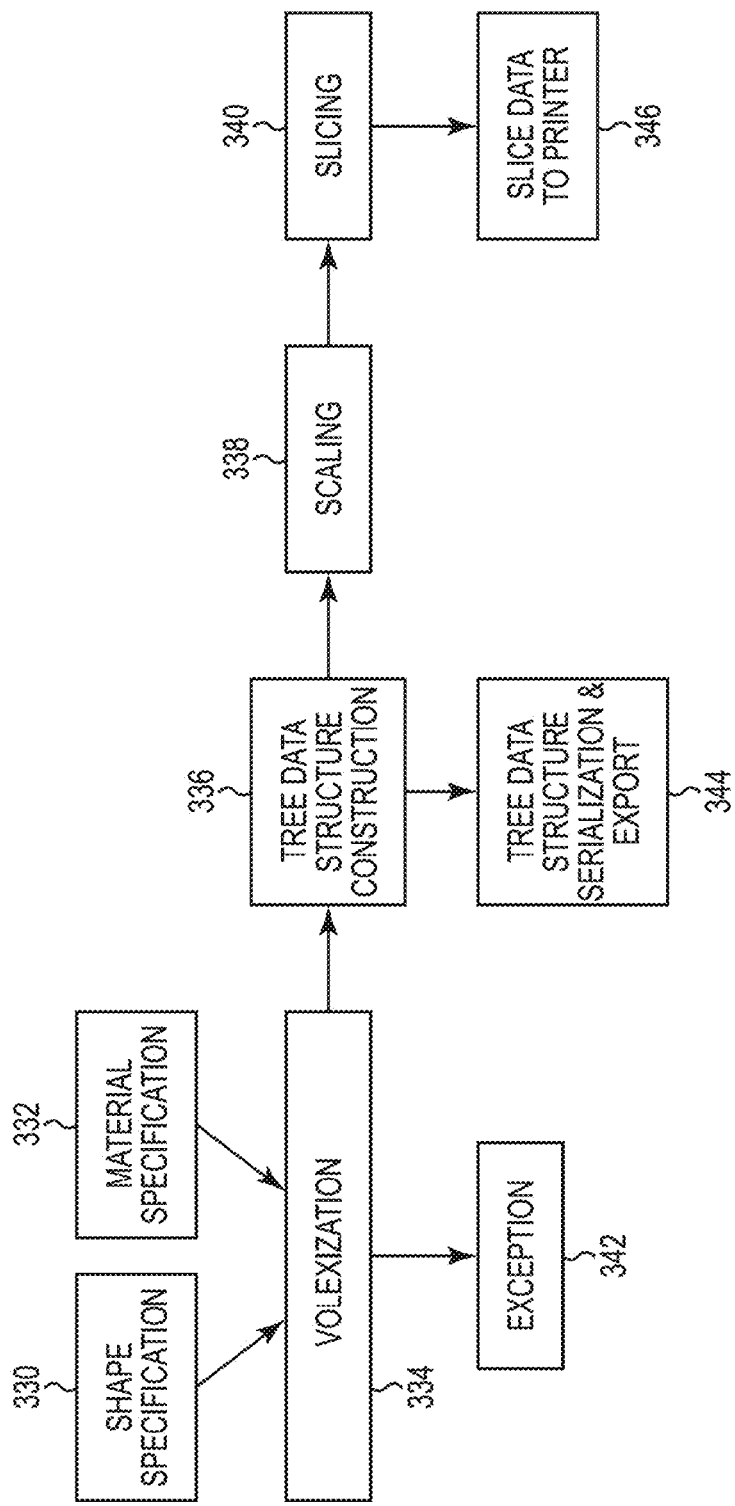
FIG. 3 illustrates a block diagram of an example of generating slice data according to the present disclosure.

FIG. 3 illustrates a block diagram of an example of generating slice data according to the present disclosure. FIG. 3 illustrates a shape specification 330, a material specification 332, a voxelization 334 of the shape specification 330 and the material specification 332 to merge the shape specification 330 with the material specification 332 to create model of the 3-D object. FIG. 3 also illustrates an exception 342, the construction of a tree data structure 336, the serialization export 344 of the tree data structure, the scaling 338 of the octree, the slicing 340 of the octree, and providing 346 the slice data to the 3-D printer (e.g., printer).

As used herein, creating the shape specification 330 and the material specification 332, merging the shape specification 330 and the material specification 332, creating a voxel representation of the shape specification 330 and the material specification 332, constructing a tree data structure 336, scaling 338 the tree data structure, and/or slicing 340 the data associated with the tree data structure can be part of a design process. The design process can be independent of a printing process which includes providing slice data to printer 346 and/or printing the slice data. For example, the design process can occur outside of a 3-D printer and/or a processing resource associated with the printer. The design process can also be part of the printing process. For example, the design process can be executed in a 3-D printer and/or in a processing resource associated with a 3-D printer.

In a number of examples the shape specification 330 can be a 3-D model that defines the shape of 3-D object. The shape specification 330 can define both the internal and the external portion of the 3-D object. The shape specification 330 can be a number of shape specifications 330. The number of shape specifications 330 can collectively define the 3-D object. For example, each of the number of shape specifications 330 can define a different portion of the 3-D object.

The shape specification 330 can be defined, for example, using polygon meshes. For example, the shape specification 330 can be defined using a number of formats such as a stereolithography (STL) file format, an OBJ file format, and/or an X3D file format among other type of files formats.

A material specification 332 is a 3-D distribution of material types and/or material properties of a 3-D object. As used herein, the terms material type and material are used interchangeably. A material type can be a material. A material property can be an attribute of a material type. The material specification 332 can be a number of material specifications 332. For example, a first material specification 332 can define a first material type while a second material specification 332 can define a second material type, the first material type and the second material type comprising the materials (e.g., different materials) used in a 3-D object. However, the number of material specifications 332 can comprise more than two material specifications.

The material specifications 332 can also define a number of material properties associated with a material type and/or a plurality of material types that comprise the 3-D object. For example, if density and color of a material type are material properties associated with a material type, then a first material specification 332 can define a density of a particular material and a second material specification 332 can define a color of the particular material.

The material specification 332 can provide a description of material heterogeneity both inside a 3-D object and on the part surface of the 3-D object. The material specification 332 can describe a number of interactions between different material types and/or property types. For example the material specification 332 can describe discrete multi-material interactions, functionally graded multi-material interactions, and digitally engineered multi-material interactions.

A material (types or properties) distribution is specified independently of the shape specifications (e.g., vertices, elements, patches). A material specification can be a three dimensional mathematical function that describes a distribution of a material attribute (e.g., planar shapes) with continuous variation of a material quantity (e.g., thermal conductivity, a concentric shape, wavelets, etc.). A distribution can also describe desired variations (discrete or continuous) in a 3-D space that enable the use of arbitrary material distribution patterns including both that of continuous (e.g., a concentric pattern) and that of discrete (e.g., a binary planar pattern). A distribution can be described via mathematical expressions or mappings from other digitized sources (e.g., images).

The shape specification 330 and the material specification 332 are independent of each other. That is, the shape specification 330 and the material specification 332 may not conform to each other. For example, a shape specification 330 can define the shape of a 3-D object while a material specification 332 can define a material outside the bounds of the shape of the 3-D object defined in the shape specification 332. However, such independence does not exclude the shape specification 330 from being part of the material specification 332 or the material specification 332 from being part of the shape specification 330. That is, such independence does not exclude the shape specification 330 and the material specification 332 from being saved in a same file.

In a number of examples, the shape specification 330 and the material specification 332 can be geometrically scaled before the shape specification 330 and the material specification 332 are merged and/or before the shape specification 330 is voxelized 334. A shape specification 330 can be geometrically scaled to a resolution of the material specification 332. A material specification 332 can be geometrically scaled to a resolution of the shape specification 332.

The above geometrical scaling can be anisotropic using scaling vectors. That is, the above geometrical scaling can be directionally dependent.

The voxelization 334 of the shape specification 330 and the material specification 332 can define the merger of the shape specification 330 and the material specification 332. Merging the shape specification 330 and the material specification 332 can also be described as the synthesizing of the shape specification 330 and the material specification 332.

The shape specification 330 and the material specification 332 can be merged by fixing the six-degrees of freedom of one specification with respect to the other specification. For instance, center-of-mass (x, y, and z) can account for three-degrees of freedom while the three rotational angles (roll, yaw, and pitch) can account for an additional three-degrees of freedom. Fixing the center-of mass (x, y, and z) and three rotational angles (roll, yaw, and pitch) can merge the material specification 332 with respect to the shape specification 330 and as a result can bind the material specification 332 and the shape specification 330.

In a number of examples, multiple shape specifications 330 can be merged with one material specification 332 to define a 3-D object. For example, a first shape specification 330 and a second shape specification 330 can be merged with a material specification 332. That is, a material specification 330 can be used to describe a material distribution over multiple portions of a 3-D object. Multiple material specifications 332 can be merged with a shape specification to define the 3-D object. For examples, a first material specification 332 and a second material specification 332 can be merged with a shape specification 330. That is, multiple material specifications 330 can describe different material properties of the 3-D object. Multiple material specifications 332 can be merged with multiple shape specifications 330 to define the 3-D object. For example, a first material specification 332 can be merged with a first shape specification 330 and a second material specification 332 can be merged with a second shape specification 330 which can define the 3-D object. That is, a first portion of a 3-D object can be defined by the first material specification 332 and the first shape specification 330 and a second portion of the 3-D object can be defined by the second material specification 332 and the second shape specification 330. Moreover, a first material specification 332 can define the thermal conductivity of a portion (e.g., a part) of the 3-D object while a second material specification 332 can define the texture of the same portion of the 3-D object.

The merging of the shape specification 330 and the material specification 332 can be performed using a number of processing resources in parallel. A number of processing resources can include a number of CPUs and/or a number of graphical processing units (GPUs), for example.

Merging the shape specification 330 and the material specification 332 can include scan-converting the shape specification 330 described using a boundary mesh into a grid of voxels. An example of a grid of voxels is provided in FIG. 4. As used herein, a voxel represents a value on a 3-D space. A voxel can be a volume associated with the 3-D space. The voxel can have a value of solid, empty, or a differently defined description of the 3-D space. The position of a voxel can be inferred based upon its position relative to other voxels. The grid of voxels that is created from the merging of the shape specification 330 and the material specification 332 can be an example of a model of the 3-D object.

In creating the grid of voxels, each of the voxels of the grid of voxels is defined. Defining a voxel can include encoding shape features at a voxel. In a number of examples, the grid of voxels can be encoded with shape features after the grid of voxels are defined. Encoding a shape feature can include storing multiple data types associated with a shape of the 3-D object other than a solid and/or empty value. The multiple data types associated with the voxel can be used to decode (e.g., reconstruct) a number of features from a particular voxel and/or a group of voxels. The number of decoded features can be shape (e.g., geometry) features or material boundaries associated with the 3-D object. The number of data types stored in each of the voxels in the grid of voxels can provide the ability to print a 3-D object with a higher resolution than that provided by the grid of voxels. The number of features decoded from the a plurality of voxels from the grid of voxels can provide an increased resolution of the 3-D object During the scan-converting of the shape specification 330 it can be determine whether shape specification 330 is watertight (e.g., air-tight). As used herein, watertight is used to describe a model that is suitable for 3-D printing. A watertight model indicates that there are no holes, cracks, or missing features in a model that would render the model unsuitable for 3-D printing. If the grid of voxels is not watertight then an exception 342 can be raised such that the scan-conversion process will terminate and reference a part of the grid of voxels that should be repaired to proceed with the 3-D printing of the 3-D object.

The scan-converting can also include transforming the material property values associated with the material specification 332 into different types of materials and/or material properties that make up the 3-D object. That is, the voxelization 334 of the shape specification 330 and the material specification 332 can include mapping voxels with materials and/or material properties described in the material specification 332.

A voxel can be mapped to material types and/or material properties by using a bottom-up parallelized construction to build up a tree data structure 336 while simultaneously evaluating the material types for each node in the tree data structure.

A bottom-up parallelized construction can include traversing the grid of voxels. For example, a plurality of leaf nodes can be associated with the grid of voxels. The leaf nodes (e.g., level i) can be traverses upstream (e.g., from a leaf node to a rood node) to find non-leaf nodes at their parent level (e.g., level i−1). A node array can be created to hold nodes leaf nodes. The quantity of leaf nodes can be eight times the quantity of non-leaf nodes in level i−1. The nodes at each level (level i−2 level i−Q) in a tree structure can be added to the node array until the root node is reached.

The node array can be created in parallel. That is, different paths in the tree structure can be traversed in parallel to add nodes to the node array. After creating the node array, the materials associated with the leaf nodes can be defined based on the material specification 332. A hierarchical propagation can be used to identify the intersection voxels, which signify the change of material properties, and fill in material information into voxels between intersection voxels. The filling process is specified along an x-axis. However, the filling process can be along any pre-defined axis.

In a number of examples, a tree data structure suitable for mapping a grid of voxels with materials and/or material properties can be an octree. The octree can store the results of the voxelization 334 of the shape specification 330 and the material specification 332.

Each voxel in a grid of voxels can be represented by a node in a tree data structure (e.g., octree). Each node can include the data associated with a corresponding voxel. For example, each node can be defined by encoding shape features, in sub-voxel feature decode module 112 in FIG. 1, using data types associated with a voxel that allow a shape feature to be decoded (e.g., extracted) from a given voxel and/or a group of voxels. As a result, the number of shape features can also be decoded from a given node in sub-voxel feature decode module 227 in FIG. 2. Decoding shape features from a particular node using associated data types can provide the ability to reconstruct shape features reaching resolution small than the size of voxel.

An octree can represent arbitrary shapes (e.g., convex, concave, and/or with holes) and can carry nodal attributes to represent any material distribution (e.g., material types and/or material properties). An octree can compress the voxel data structure by using the largest possible voxels to represent homogeneous regions. As used herein, a region is homogeneous when multiple neighboring nodes in the tree data structure (e.g., octree) have a uniformity of shape, material types, and/or material properties without boundaries associated with the shape of the 3-D object and/or boundaries associated with the materials and/or material properties that form the 3-D object intersecting the multiple neighboring nodes.

An additional light-weight post-processing procedure, that is referred to herein as octree clipping, can be implemented to further examine the tree to merge neighboring homogenous nodes into one. Significant file size reduction of a file used to store the tree data structure can be achieved by performing post-processing octree clipping. Furthermore, tree data structure serialization export 344 (e.g., deserialization) can be implemented to allow writing a tree data structure to a file for future use or for other applications. That is, an octree can be serialized and exported to provide a template of the 3-D object that can be referenced independently of the printing of the 3-D object on a particular 3-D printer. For example, an octree that is created to print a 3-D object on a first 3-D printer can be re-used to print the 3-D object on a second 3-D printer with a different printing resolution than the first 3-D printer without having to recreate the octree.

The tree data structure can be scaled 338 post-processing to meet the printing resolution of a particular 3-D printer. As used herein, post-processing refers to processing that occurs after the construction of the tree data structure 336. That is, the tree data structure can be scaled 338 independently of the construction of the tree data structure 336. Scaling 338 the tree data structure post-processing provides the ability to reuse a tree data structure to print a 3-D object on a plurality of 3-D printers with different printing resolutions without reconstructing the tree data structure multiple times.

In a number of examples, a scaling 338 of the tree data structure can be performed using a plurality of processors in parallel. A tree data structure with a particular resolution can be scaled to a higher resolution by examining and partitioning leaf nodes where deeper heterogeneity can be materialized while preserving the existing tree data structure.

Scaling a tree data structure to a higher resolution that that provided by the tree data structure can include decoding shape features from the individual voxels using associated data types associated with the individual voxels. The shape features can be decoded at a sub-voxel feature module 110 and/or a sub-voxel feature engine 225 in FIGS. 1 and 2, respectively.

A tree data structure with a particular resolution can also be scaled 338 to a lower resolution by examining and merging leaf nodes that may include similarities while preserving the existing tree data structure. For example, the solid nodes in a bottom layer of the tree data structure can be merged to scale 338 a tree data structure to a lower resolution.

Scaling 338 while preserving the existing tree data structure is referred to herein as graceful scaling because the tree data structure is not reconstructed but rather uses a previously existing tree data structure to further define (e.g., provide a higher resolution) the tree data structure.

Graceful scaling provides for efficient processing of the tree data structure. For example, a tree data structure can be computed and stored once with a default resolution using a shape specification 330 and material specification 332. A printing resolution and a number of materials allowed by a 3-D printer can be obtained to print a 3-D object us ing the tree data structure. The printing resolution and the number of materials can be compared to default resolution of the tree data structure and the number of materials used in the tree data structure. Based on the comparison, the tree data structure can be scaled 338 to meet the resolution of a particular 3-D printer. In a number of examples, the tree data structure can be reevaluated to remove redundant nodes after the tree data structure is scaled 338.

Figure 6:
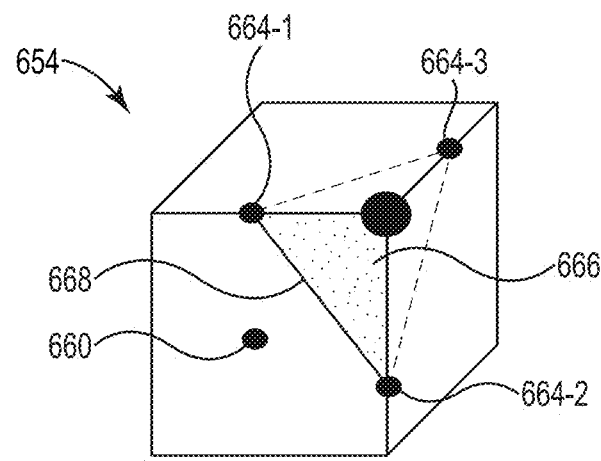
FIG. 6 illustrates an example of a sub-voxel feature according to the present disclosure.
Figure 7:
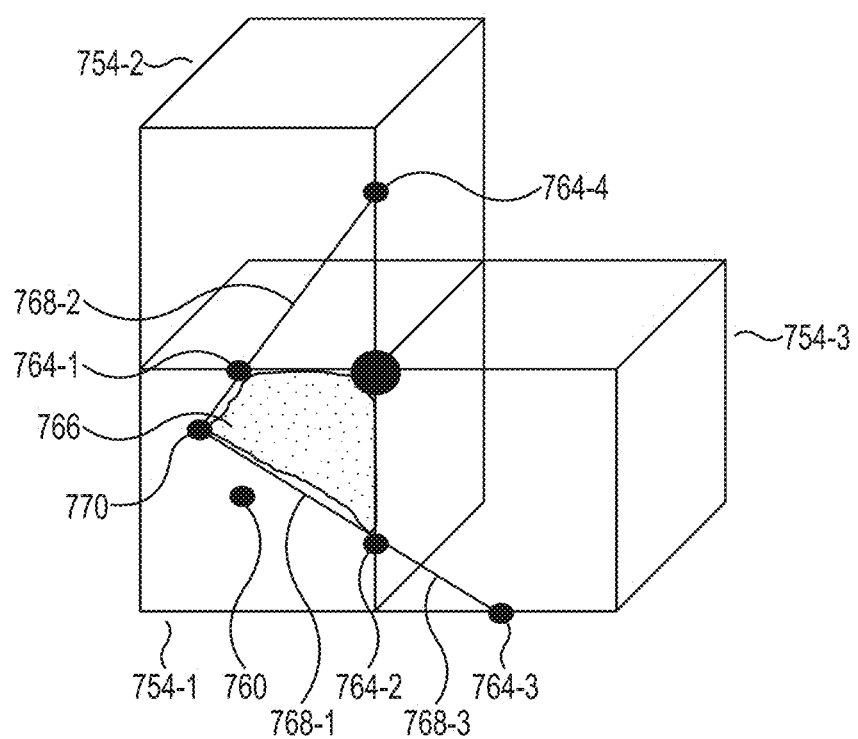
FIG. 7 illustrates an example of an interception line according to the present disclosure.

The tree data structure can be sliced 340 to provide slice data to the 3-D printer. The tree data structure can be sliced 340 after the construction 336 of the tree data structure and/or the scaling 338 of the tree data structure. As used herein, slice data is a portion of the data inscribed in the tree data structure. FIGS. 6 and 7 provide examples of slice data.

The tree data structure can be sliced 340 by implementing a top-down traversal of the tree data structure on a number of CPUs and/or GPUs and by associating neighboring nodes with each other. Neighboring nodes can be associated, for example, using node levels. That is, a tree hierarchy associated with the tree data structure can be defined. In a number of examples, the tree hierarchy associated with the tree data structure can be defined at a voxelization 334 of the shape specification 330 and/or the material specification 332, during a construction of the tree data structure 336, and/or during the scaling 338 of the tree data structure. Implementing a top-down traversal of the tree data structure and a grouping of nodes can accelerate the slicing 340 of the tree data structure.

Slicing 340 the tree data structure can include identifying a z-coordinate of a slice plane. The z-coordinate of the slice plane can be used to traverse the tree data structure to identify relevant nodes intercepted by the slice plane. The shape and material attributes associated with the relevant nodes can be collected to comprise the slice data. In a number of examples, the slice data can be further separated into a number of bitmaps per material types which can be transmitted to the printer to drive the printing of the 3-D object (e.g., drive the material deposition and object forming).

The slice plane can be independent of a voxel size and/or voxel resolution associated with the voxel representation (e.g., the grid of voxels). Independence between the voxel resolution and the slice plane can be created due to the data types stored in association with each of the voxels in the grid of voxels. For example, the data types can provide the ability to create a slice plane that can be used to provide shape features, via decoding (e.g., sub-voxel feature decoded module 112 and/or sub-voxel feature decode engine 227), from within the voxels without dividing a voxel into multiple voxels. The shape features can be reconstructed using surface triangles that are calculated using the data types (e.g., edge data, surface data, volumetric data, and/or nodal data).

FIGS. 6 and 7 show examples of such shape feature decoding (e.g., re-construction). This re-construction is to serve the slice module 111 and/or slice engine 226, such that, when implementing plane cuts through this voxel, the resolution of the material change will not be limited at the voxel size (e.g., level), rather, the change in material can be defined within a voxel by intercepting this cutting plane with interception line 768-1 in FIG. 7, for example.

Figure 5:
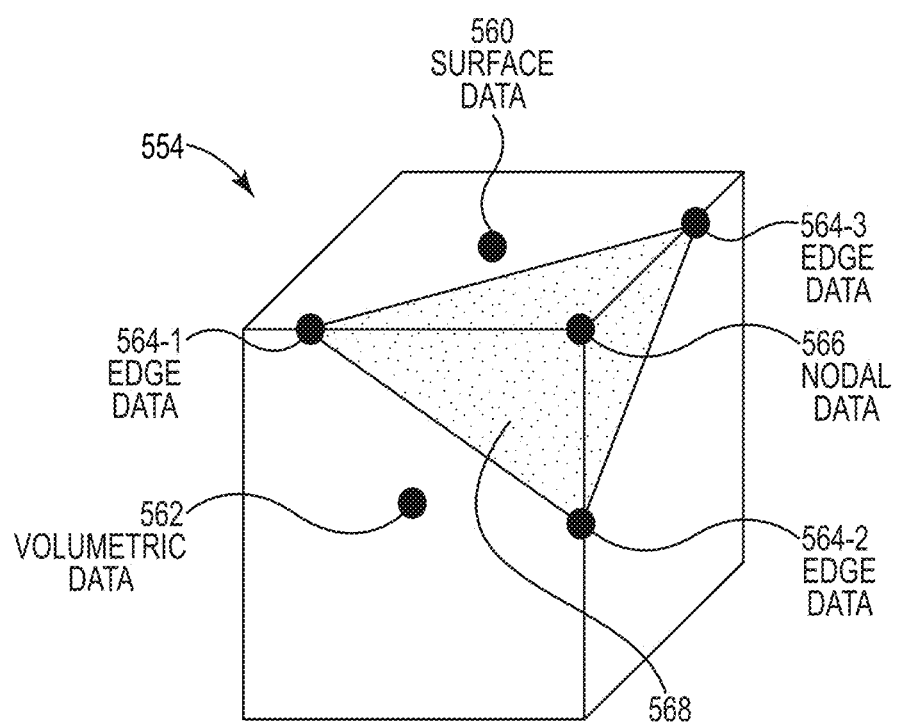
FIG. 5 illustrates an example of a voxel according to the present disclosure.

The surface triangles can define a cut boundary as described in FIG. 5. A cut boundary is a 3-D surface (e.g., flat or curved) that represents the intercept of the features of a 3-D object (e.g., shape boundary and/or material boundary) with a particular voxel. A cut boundary can be defined by a number of interception lines. FIGS. 6 and 7 illustrate an example of an interception line. FIGS. 6 and 7 also illustrate how data types stored in voxels can be used to reconstruct surface triangles to define shape features in the form of cut boundaries. As used herein, a cut boundary can describe a plane that divides the volume of a voxel into at two portions. However, the examples provided herein are not limited to re-constructing surface triangles. In a number of examples, other types of forms can be re-constructed. For example, re-constructing shape features can include other forms of but boundary representation techniques such as functional representations, for example.

In a number of examples, shape features and/or material boundaries can be decoded from voxels using the associated data types before and/or during the slicing 430 of the tree data structure. The slice data can include the shape features (sub-voxel features) decoded from voxels using associated data types. As used herein, the terms shape features and sub-voxel features are used interchangeably.

Providing 346 the slice data to the printer can include progressively streaming the slice data to a 3-D printer to enable the printing of the 3-D object. Streaming the slice data can provide ability to print large and complex 3-D objects without overburdening the printer networking and storage associated with the 3-D printer. Streaming the slice data can reduce the storage space used by the 3-D printer to receive the slice data because the slice data that is streamed to the 3-D printer does not describe the entire 3-D object at once but rather provides a portion of a description of the 3-D object at a given time.

The slicing of a tree data structures in a 3-D printer will be bounded by the CPU and memory installed in the 3-D printer. Uploading slice data to the 3-D printer will be bound by the storage space installed in the 3-D printer.

A computing device can slice the tree data structure using parallelized GPUs. The computing device can also stream the slice data to the 3-D printer. Streaming the slice data to the 3-D printer can include streaming a single slice or a plurality of slices at a given time. The rate of slices from the slice data streamed to the 3-D printer can be associated with the storage space available to the 3-D printer and the time to print a layer a layer using the 3-D printer. For example, if a first slice of slice data can be provided to the 3-D printer, then a second slice of data can be provided to the 3-D printer after the 3-D printer prints the a portion of the 3-D object associated with the slice of data.

In a number of examples, the slice data can be continuously streamed to the printer until a total unprinted slice count stored at the 3-D printer is equal to a particular number of slices (e.g., a user set number bound by storage limitation in printer). In a number of examples, the slice data that has been printed is discarded.

A first-in-first-out queue can be used to store streamed slices in the 3-D printer. The queue length (N) can be bound by the storage space in the 3-D printer. A 3-D printer can pull a slice of the slice data (e.g., current slice) from the head of a queue, print the pulled slice, and/or discard the printed slice. The 3-D printer can request additional slice data from the slice engine 226 if there is an empty cell in queue. The slice engine 226 can process an additional slice and provide the additional slice to the 3-D printer.

Figure 4:
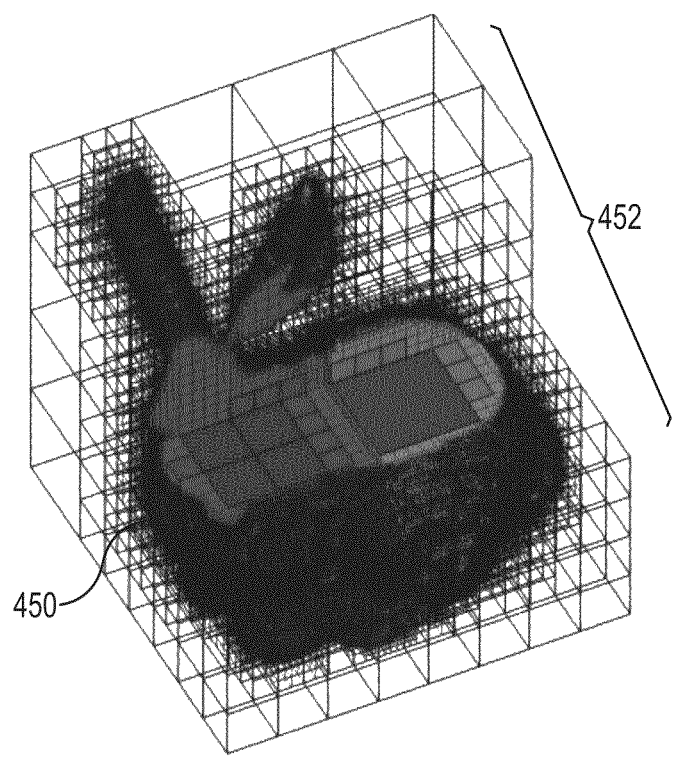
FIG. 4 illustrates an example of a grid of voxels according to the present disclosure.

FIG. 4 illustrates an example of a grid of voxels according to the present disclosure. FIG. 4 illustrates a 3-D object 450 and a grid of voxels 452.

As illustrated in FIG. 4, each voxel ds represented by a cube. However, other shapes can be used to represent a voxel. Each of the plurality of voxels can have different dimensions. For example, a first voxel from the grid of voxels 452 can define a first volume while a second voxel from the grid of voxels 452 can define a second volume. A resolution associated with the grid of voxels 452 and/or a tree data structure that corresponds to the grid of voxels 452 can be defined by a smallest voxel from the grid of voxels 452. A smallest voxel can be defined in terms of volume, area, material type and/or material property discretization, and/or any other standard provided for comparing voxels.

In FIG. 4, the volume associated with a given voxel can decrease to accommodate the shape of the 3-D object 450. For example, a first shape associated with the 3-D object 450 may be represented using a first number of voxels wherein each of the first number of voxels has a first volume. A second shape associated with the 3-D object 450 that is less intricate than the first shape may be represented a second number of voxels wherein each of the second number of voxels has a second volume that is greater than the first volume.

FIG. 5 illustrates an example of a voxel according to the present disclosure. FIG. 5 shows a voxel 452 having a plurality of data types. The data types include a surface data 560, a volumetric data 562, edge data 564-1, 564-2, 564-3 (e.g., referred to herein as edge data 564), and nodal data 566. More or less data types than those shown in FIG. 5 can be used.

FIG. 5 also illustrates a cut boundary 568 interception with voxel 452 resulting in a triangular cut. This cut boundary 568 may be part of shape specification or part of the material specification to describe a boundary between two different materials and/or material properties).

Volumetric data 562 can describe a volumetric fractional percentage of a material. The volumetric data can be associated with a voxel center. The volumetric fractional percentage is calculated after computing a cut boundary 568 which separates a voxel's volume into at least two portions. The cut boundary 568 can be calculated using a number of interception lines (e.g., triangular intercepting lines). A surface normal is usually associated with the cut boundary 568 which indicates which side of the cutting boundary is which material or, in terms of describing geometry, which side is inside (e.g., solid) a 3-D object and which side is outside (e.g., void) the 3-D object. The surface normal allows the computation of the volumetric fractional percentage by informing which side of the cutting triangle is solid. The information provided by the surface normal and the volumetric fractional percentage (e.g., which side is solid, which side is void) is in turn recorded as nodal data. For instance, the node data 566 can be marked differently from nodal data associated with the other seven corners of the voxel 554.

For example, node data 566 can be marked as void to label the tetrahedron volume defined by node 566 and a cut boundary 568, which is defined by the three interception lines linking edge data 564-1, 564-2, and 564-3, as being devoid of a material type and/or material property. The nodal data associated with the other 7 corners of the voxel 554 can be marked as solid to label the remaining volume in voxel 554 as being formed by a material type and/or a material property. The cut boundary 568 is defined by the triangular intercepting lines linking edge data 564-1, 564-2, and 564-3.

Surface data 560 can describe an area fractional percentage of a material. The surface data may be associated with the center of a surface that forms a voxel. The surface fraction can be recorded as a surface value. For example, the top surface can be partitioned into two parts by an interception line connecting edge data 564-1 and 564-3. The surface fraction for this surface records the percentage of the top surface that is occupied (e.g., solid).

Edge data 564 can indicate the intersection points. Connecting interception points form an intercepting line. In FIG. 5 the interception line is a straight line but can also be curved. Closed segments of intercepting lines can define a cut boundary 568 that cuts through voxel 554. In FIG. 5, a cut boundary 568 is represented by the lines connecting edge data (e.g., interception points) 564-1, 564-2, and 564-3. A cut boundary 568 can represent the boundary of a material. The cut boundary 568 can cut (e.g., intersect) a voxel when the cut boundary 568 lies within the volume described by the voxel 554. The edge data 564 can describe the intersection of the cut boundary 568 and the voxel without dividing the voxel 554 into a plurality of voxels to provide a higher resolution of the volume described by voxel 554. Nodal data 566 can provide an identification (ID) of a number of materials that are associated with the voxel 554.

Each of the data types (e.g., surface data 560, volumetric data 562, edge data 564, and nodal data 566) can be a single floating point or may be a plurality of floating points. For example, a volumetric data 562 can include a plurality of floating points that describe the division of the voxel 554. For example, the volumetric data can include a 0.7 floating point and a 0.3 floating point that describe the bifurcation of the volume described by voxel 554. For example, a cut boundary 568 defined by edge data 564 can have a volumetric fractional percentage of 0.3 while the other portion of voxel 554 can have a volumetric fractional percentage of 0.7.

The shape and material associated with a voxel 554 can further be captured by adding a material type "void" that fills in all the space outside of the solids defined by shape specification. A void material type provides the ability to unify the shape specification and the material specification.

To describe a single-material part, volumetric data 562 can be a single floating point recording the volumetric percentage of this material that fills voxel 554. The void percentage occupation can be easily computed as the whole is one. To describe an N-material part, a volumetric fraction can be a plurality of floating points of size N. The surface data 560 and the edge data 564 can be similarly defined.

The data types can be used to describe a shape and material distributions. Additional data types not shown herein can be used to describe material properties associated with a voxel 554. For instance, color and texture can be surface data associated with a surface. Thermal expansion coefficient and Young's modulus are bulk material properties that can be are volumetric data 562 associated with the voxel's 554 volume.

The voxelization 334 in FIG. 3 of the shape specification and the material specification can be directly applied to fill in these data types when processing both the shape and material specifications. For example, while analyzing a surface triangle associated with a shape specification, the edge data 564 can be computed and stored by sub-voxel feature encoded module 110 and/or sub-voxel feature encoded engine 227. Then, during the voxelization process the nodal data 566, surface data 560, and/or volumetric data 562 can be computed and associated with node 554. In a number of examples, the data types can be associated with a given voxel 554 during the construction of the tree data structure 336, the scaling 338, and/or the slicing 340 of a tree data structure as described in FIG. 3.

If all neighboring voxels are similar (e.g., having similar data types and similar values for the corresponding data types), then the neighboring voxels can be combined into a larger leaf node for the tree data structure (e.g., octree). In other words, the clipping of a tree data structure is applicable for this data structure.

FIG. 6 illustrates an example of a sub-voxel feature according to the present disclosure. FIG. 6 includes a voxel 654 which is analogous to voxel 554, edge data 664-1, 664-2, and 664-3, which are analogous to edge data 564-1, 564-2, and 564-3 in FIG. 5, and surface data 660. FIG. 6 provides an example of calculating an interception line. The example provided in FIG. 6 can be repeated a number of times to identify a plurality of plurality lines. Enclosed segments of interception lines can define a cut boundary 568 in FIG. 5, for instance.

In the example provided in FIG. 6, the interception line can be part of is a linear connected surface polygon 666. The interception line 668 is computed from edge data 664-1 and 664-2. The interception line 668 can be computed at a sub-voxel feature decode module 112 and/or a sub-voxel feature decode engine 227.

FIG. 6 illustrates an example of decoding (e.g., re-capturing) a shape feature associated with a 3-D object. Edge fractions of the area associated with the surface of voxel 654 can be used to compute the edge data 664-1 and 664-2 (e.g., interception points). An interception line 668 on the surface of voxel 654 can be computed from the edge data 664-1 and 664-2.

In a number of examples, edge data 664-1 and 664-2 can be connected by a straight line (e.g., recall that STL uses linear surface triangle). Based on the nodal data associated with voxel 654 (e.g., material ID) a surface fraction of the surface polygon 666 can be computed. If the computed surface fraction is equal to the corresponding surface data, then interception line 668 is assumed to be a straight line. As such, the straight line is accepted as part of the surface polygon 666 and/or the cut boundary 568.

If the computed surface fraction does not equal the surface data associated with voxel 654, then the interception line 668 is not a straight line. In a number of examples, if the interception line 668 is not a straight line, then it can be assumed that an additional point is included in interception line 668. FIG. 7 shows an example of an interception line 668 that includes an additional point of reference that is calculated using neighboring voxels as shown in FIG. 7.

Similar procedures can be extended to multi-material voxels where multiple interception lines may exist (e.g., not shown). A plurality of values for the surface data can be applied to determine the linear and/or non-linear connections between the associated edge data.

In the examples provided in FIGS. 6 and 7, the shape features are modeled using piecewise linear surfaces. The use of STL file format and similar file formats can facilitate the modeling of the shape features using piecewise linear surfaces.

Furthermore, if it is known that the shape features associated with voxel 664 are smooth, then higher-order (e.g., $2^{nd}$ order) surface models and G1 (derivative) connectivity can be applied to connect the interception line 668 between edge data 664-1 and 664-2. The shape features can be smooth if, for instance, post processing is implementing a flame torch In the example provided in FIG. 6 the surface polygon 666 is determined using the surface data and the edge data 664-1 and 664-2. In a number of examples, a cut boundary can be determined using a number of surface polygons, the surface data, the edge data, and/or the volumetric data associated with voxel 654 and its neighboring voxels.

For example, the edge data 664 (e.g., points) can be used by a boundary reconstruction model (e.g., a plane or a non/plane) to determine a cut boundary if the volume created by the cut boundary is equal to an associated volumetric data. A simple boundary reconstruction model (e.g., a plane) is shown in the example provided in FIG. 5. The boundary reconstruction model used to connect the edge data 664 associated with voxel 654 can describe complex shape features. As used herein, a shape feature is complex if a boundary reconstruction model is any model other than a plane.

In an example where the shape specification is implemented using a native computer-aided design (CAD) file (e.g., non-uniform rational basis spline (NURBS) surfaces) complex boundary reconstruction model can be applied to describe the shape feature associated with a voxel and/or a group of neighboring voxels. For instance, when scan-converting the shape specification (e.g., CAD file), the relevant NURBS control points can be stored within a voxel. The control points associated with a particular voxel can be used to re-capture the NURBS surface and/or the complex shape features of the 3-D object.

In examples where the shape specification is analytically described (e.g., quadratic, surface sinusoidal, and/or any other analytical form), the analytical functions can be used to parameterize the shape features and can serve as a basis for the boundary reconstruction model. The data types (e.g., edge data, surface data, volumetric data, and/or nodal data) carried by a particular voxel and its neighboring voxels can be used to fit the analytical functions.

For example, a function, $F(a0, a1, a2 \ldots ; x, y, z)=0$, can be used to model the cut boundary that intercepts a voxel 654, where a0, aN are data types recorded in a particular voxel and/or its neighboring voxels. The data types can consist, for instance, of the edge data that defines an interception point therefore f(interception point)=0 for every interception point (x0, y0, z0). Connecting edge data (e.g., G1) may add additional surface derivative constraints. Additionally, if a surface is smooth across the interception points, then additional equations can be included. The additional equation can include surface derivatives of function f at (x0,y0,z0) equals to zero, for instance. Surface and/or volumetric data can add an integral constraints (i.e., aided by the nodal data) to compute a surface/volume integral using $f(a0, a1, a2 \ldots )$ as a boundary to meet the surface and/or volumetric data recorded in a particular voxel.

The data types recorded in each voxel may serve as basis to solve for the boundary reconstruction model which explicitly re-captures the cut boundaries and thus preserve simple and complex shape features at a sub-voxel resolution.

This disclosed sub-voxel feature modeling may enable vectorised slicing planes independent of the voxel size. Such slicing planes can then be resolved at the printer resolution. Resolving slicing planes can include generating multiple bitmap images (e.g., gray-scale bitmap images) each to drive deposition of one material type.

In a number of examples of the present disclosure, the voxel resolution and the shape feature resolution are decoupled and may be independent of each other. The decoupling of feature resolution from voxel resolution may provide the ability to resolve fine features at a printer resolution.

In a number of examples, sub-voxel features can be captured by decreasing the size of voxels. Decreasing the size of voxels can be a form of scaling. Decreasing the size of voxels and storing a grid of voxel may increase the storage space needed to store the grid of voxels as compared to retaining a voxel size and including data types in the voxels.

FIG. 7 illustrates an example of an interception line according to the present disclosure. FIG. 7 includes voxels 754-1, 754-2, and 754-3, edge data 764-1, 764-2, 764-3, and 764-4, and surface data 760. Edge data 764-1 and 764-2 is associated with voxel 754-1. Edge data 764-1 and 764-4 is associated with voxel 754-2. Edge data 764-2 and 764-3 is associated with voxel 754-3.

If the interception line 768-1, in FIG. 6, is determined to not be a straight line then a different connecting model can be determined. In the example provided in FIG. 7, the interception line 768-1 is assumed to be a linear connection between edge data 764-1 and 764-2. For example, the interception line 768-1 can be calculated using a line including an additional point 770 that is calculated using neighboring voxels 754-2 and 754-3.

An interception line 768-1 associated with voxel 754-1 can be determined using edge data associated with neighboring voxels 754-2 and 754-3. For example, the linear connection between edge data 764-1 and 764-2 that forms an interception line 768-1 can be determined using the edge data 764-1, 764-2, 764-3 and 764-4.

The interception line 768-2 between edge data 764-1 and 764-4 that is associated with voxel 754-2 can be used to determine interception line 768-1. The interception line 768-3 between edge data 764-3 and 764-2 that is associated with voxel 754-3 can also be used to determine interception line 768-1. The interception line 768-2 can be extended past edge data 764-1 to form interception line 768-1. The interception line 768-3 can also be extended past edge data 764-2 to form 768-1. The extension of interception line 768-2 and the extension of interception line 768-3 can meet at point 770 to form interception line 768-1. The interception line 768-1 can be used to define a surface polygon (e.g., triangle, quadrilateral, or other shape) 766. A surface fraction associated with surface polygon 766 can be calculated. The surface fraction associated with surface polygon 766 can be compared to surface data 760.

If the surface fraction associated with the surface polygon 766 is determined to be equal to surface data 760, then interception line 768-1 can be used to define a cut boundary that can define a shape feature of the 3-D object. If the surface fraction associated with the surface polygon 766 is determined not to be equal to surface data 760, then a different interception line 768-1 can be calculated using a combination of the edge data 764-1, 764-2, 764-3, 764-4 and/or edge data not shown in FIG. 7.

The interception line 768-1 can be used to re-capture a sharp corner that falls inside voxel 754-1 at a sub-voxel resolution.

Figure 8:
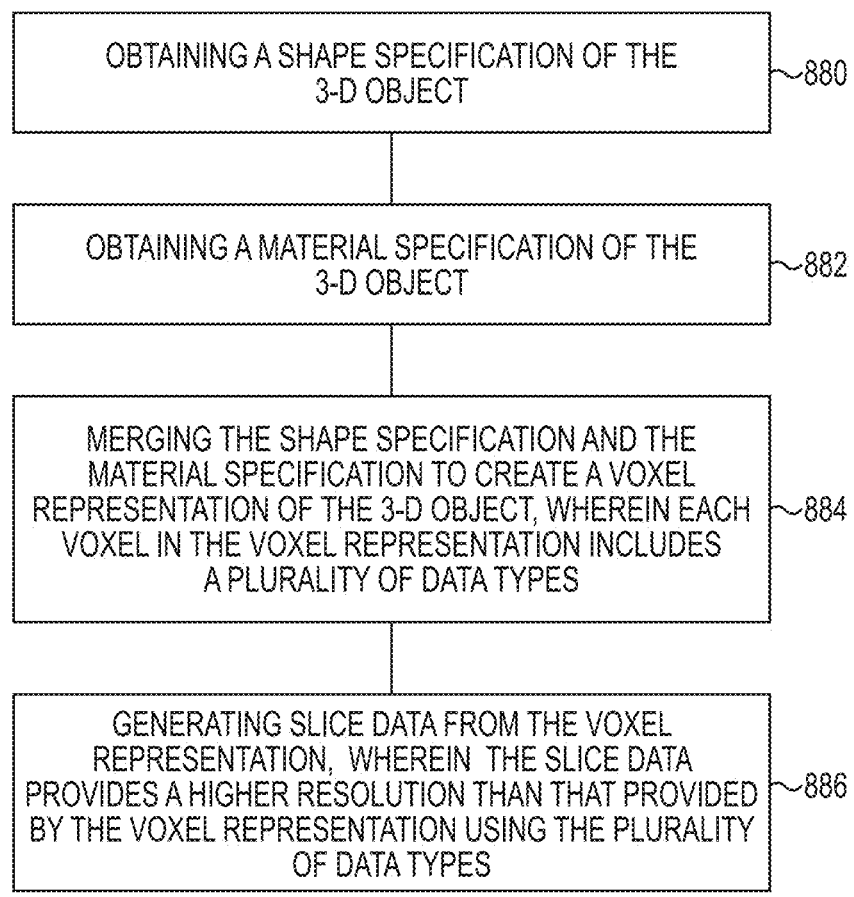
FIG. 8 illustrates a flow diagram of an example of a method for generating slice data from a voxel representation according to the present disclosure.

FIG. 8 illustrates a flow diagram of an example of a method for generating slice data from a voxel representation according to the present disclosure. As shown at 880, a method can include obtaining a shape specification of the 3-D object. The shape specification can be a 3-D model of the 3-D object. As shown at 882, the method can include obtaining a shape specification of the 3-D object. In a number of examples, the shape specification and the material specification can be independent from each other. The material specification can be a 3-D distribution of materials and/or material properties. In a number of examples, material properties can define a number of material types and/or a number of material properties (e.g., attributes) of a material type.

As shown at 884, the method can include merging the shape specification and the material specification to create a voxel representation of the 3-D object, wherein each voxel in the voxel representation includes a plurality of data types. Merging the shape specification can include associating a plurality of data types with each voxel that define a shape features within particular voxels in the voxel representation. Merging the shape specification and the material specification can include creating a grid of voxels from the shape specification and mapping the material specification with the grid of voxels. Mapping the material specification can also include mapping the material property values from the material specification to the grid of voxels and assigning the material property values to the grid of voxels. Merging the shape specification and the material specification can also include converting the grid of voxels into a tree data structure. As shown at 886, the method can include printing the 3-D object by providing slice data from the voxel representation to a 3-D printer wherein the slice data provides a higher resolution than that provided by the voxel representation using the plurality of data types.

As shown at 886, the method can include generating slice data from the voxel representation, wherein the slice data provides a higher resolution than that provided by the voxel representation using the plurality of data types.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. The proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A method for generating slice data from a voxel representation comprising:
obtaining a shape specification of the three-dimensional (3-D) object;
obtaining a material specification of the 3-D object;
merging the shape specification and the material specification to create a voxel representation of the 3-D object, wherein each voxel in the voxel representation includes a plurality of data types; and
generating slice data from the voxel representation, wherein the slice data captures a cut boundary of a particular voxel in the voxel representation using the plurality of data types, wherein the cut boundary is defined by linear and non-linear interception lines.

2. The method of claim 1, wherein the plurality of data types includes volumetric data that describes a volumetric fractional percentage of a material.

3. The method of claim 2, wherein the volumetric data is associated with a voxel center of the particular voxel.

4. The method of claim 1, wherein the plurality of data types includes surface data that describes an area fractional percentage of a material.

5. The method of claim 4, wherein the surface data is associated with a center of a surface associated with a voxel center.

6. The method of claim 1, wherein the plurality of data types includes edge data that describes an intersection of a material boundary and the particular voxel.

7. The method of claim 1, wherein the plurality of data types includes material data that provides an identification (ID) of a material that is associated with the particular voxel.

8. The method of claim 1, wherein the plurality of data types includes edge data, surface data, and volumetric data of the 3-D object.

9. The method of claim 1, wherein the slice data provides a higher resolution than that provided by the voxel representation.

10. A non-transitory machine-readable medium storing instructions for generating slice data from a voxel representation, the instructions executable by a machine to cause the machine to:
obtain a shape specification of the three-dimensional (3-D) object;
obtain a material specification of the 3-D object;
merge the shape specification and the material specification to create a voxel representation of the 3-D object, wherein each voxel in the voxel representation includes a plurality of data types;
slice the voxel representation along slicing planes using the plurality of data types wherein the slicing planes are independent of a voxel size associated with the voxel representation; and
generate slice data based on the slicing of the voxel representation, wherein the slice data captures a cut boundary of a voxel in the voxel representation, wherein the cut boundary is defined by linear and non-linear interception lines.

11. The non-transitory machine-readable medium of claim 10, wherein the instructions executed to slice the voxel representation include instructions to define surface triangles that are associated with the voxel.

12. The non-transitory machine-readable medium of claim 11, wherein the surface triangles further divide the voxel.

13. The non-transitory machine-readable medium of claim 11, wherein the surface triangles are defined using the plurality of data types.

14. The non-transitory machine-readable medium of claim 10, wherein the plurality of data types includes edge data, surface data, and volumetric data of the 3-D object.

15. A system for generating slice data from a voxel representation, comprising:
a processor; and
a memory storing instructions that when executed cause the processor to:
obtain a shape specification of the three-dimensional (3-D) object;
obtain a material specification of the 3-D object;
merge the shape specification and the material specification to create a voxel representation of the 3-D object, wherein each voxel in the voxel representation includes a plurality of data types;
define cut boundaries of a particular voxel using a plurality of data types associated with the particular voxel and a plurality of data types associated with a neighboring voxel; and
generate slice data from the voxel representation, wherein the slice data captures the cut boundaries of the particular voxel, and wherein the cut boundaries are defined by linear and non-linear interception lines.

16. The system of claim 15, wherein the slice data provides a higher resolution than that provided by the voxel representation.

17. The system of claim 16, wherein the plurality of data types includes edge data, surface data, and volumetric data of the 3-D object.

* * * * *

UNITED STATES PATENT AND TRADEMARK OFFICE
CERTIFICATE OF CORRECTION

PATENT NO. : 10,181,216 B2
APPLICATION NO. : 15/542901
DATED : January 15, 2019
INVENTOR(S) : Jun Zeng et al.

Page 1 of 1

It is certified that error appears in the above-identified patent and that said Letters Patent is hereby corrected as shown below:

In the Drawings

In sheet 2 of 7, Fig. 3, reference numeral 334, Line 1, delete "VOLEXIZATION" and insert -- VOXELIZATION --, therefor.

Signed and Sealed this
Twenty-first Day of May, 2019

Andrei Iancu
*Director of the United States Patent and Trademark Office*